(12) United States Patent
Kopp et al.

(10) Patent No.: US 6,839,486 B2
(45) Date of Patent: Jan. 4, 2005

(54) CHIRAL FIBER GRATING

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 64 days.

(21) Appl. No.: 10/097,024

(22) Filed: Mar. 14, 2002

(65) Prior Publication Data

US 2002/0131707 A1 Sep. 19, 2002

Related U.S. Application Data

(60) Provisional application No. 60/275,845, filed on Mar. 14, 2001.

(51) Int. Cl.[7] .................................................. G02B 6/00
(52) U.S. Cl. .................................... 385/37; 385/123
(58) Field of Search .......................... 385/37, 123–128, 385/42, 43

(56) References Cited

U.S. PATENT DOCUMENTS

| | | | | |
|---|---|---|---|---|
| 4,630,889 A | * | 12/1986 | Hicks, Jr. ..................... | 385/123 |
| 5,361,320 A | * | 11/1994 | Liu et al. ..................... | 385/143 |
| 6,115,526 A | * | 9/2000 | Morse .......................... | 385/125 |
| 6,314,224 B1 | * | 11/2001 | Stevens et al. ............. | 385/113 |
| 6,493,486 B1 | * | 12/2002 | Chen ........................... | 385/37 |
| 6,671,293 B2 | * | 12/2003 | Kopp et al. ................... | 372/6 |
| 6,721,469 B2 | * | 4/2004 | Kopp et al. .................. | 385/11 |
| 6,735,985 B2 | * | 5/2004 | DiGiovanni et al. ......... | 65/402 |

* cited by examiner

*Primary Examiner*—Joseph Williams
*Assistant Examiner*—Dalei Dong
(74) *Attorney, Agent, or Firm*—Edward Etkin, Esq.

(57) ABSTRACT

A a chiral fiber grating mimicking a cholesteric liquid crystal structure to achieve fiber Bragg grating properties, is provided. The chiral fiber grating includes a first and a second helical structures disposed along its central longitudinal axis, where the second helical structure is identical in orientation to the first helical structure but is shifted by one half of the structure's pitch forward. In another embodiment of the invention, only a single helical structure is disposed along the fiber to create an optically resonant chiral fiber.

18 Claims, 7 Drawing Sheets

US 6,839,486 B2

CHIRAL FIBER GRATING

CROSS REFERENCE TO RELATED APPLICATIONS

The present patent application claims priority from the commonly assigned U.S. provisional patent application Ser. No. 60/275,845 entitled "Helical Fiber Bragg Grating" filed Mar. 14, 2001.

FIELD OF THE INVENTION

The present invention relates generally to fiber grating type structures, and more particularly to an optical fiber grating having chiral properties.

BACKGROUND OF THE INVENTION

Coherent laser beam sources have many industrial applications—for example in communication systems, in information processing, and in holographic displays. There are two previously known types of one-dimensional (1D) photonic band gap (PBG) structures: (1) periodic layered media, and (2) cholesteric liquid crystals (CLCs). In both of these systems the wavelength inside the medium at the center of the band gap is twice the period of the structure in question. In CLC structures, the band gap exists only for the circular polarized component of light, which has the same sense of rotation as the structure. The second circular component is unaffected by the structure. The first type of structure has been implemented in optical fibers and is known as a fiber Bragg grating (FBG). However, the second type of structure—CLCs—does not exist in the form of fibers. Fiber Bragg gratings have many applications—fiber components form the backbone of modern information and communications technologies and are suitable for a wide range of applications—for example in information processing and especially in optical fiber communication systems utilizing wavelength division multiplexing (WDM). However, FBGs based on conventional periodic structures are not easy to manufacture and suffer from a number of disadvantages. Similarly, other types of desirable fiber gratings are difficult to fabricate using previously known techniques.

The conventional method of manufacturing fiber gratings (including FBGs) is based on photo-induced changes of the refractive index. One approach requires fine alignment of two interfering laser beams along the length of the optical fiber. Extended lengths of periodic fiber are produced by moving the fiber and re-exposing it to the interfering illumination while carefully aligning the interference pattern to be in phase with the previously written periodic modulation. The fiber core utilized in the process must be composed of specially prepared photorefractive glass, such as germanium doped silicate glass. This approach limits the length of the resulting grating and also limits the index contrast produced. Furthermore, such equipment requires perfect alignment of the interfering lasers and exact coordination of the fiber over minute distances when it is displaced prior to being exposed again to the laser interference pattern.

Another approach to fabricating fiber gratings involves the use of a long phase mask placed in a fixed position relative to a fiber workpiece before it is exposed to the UV beam. This approach requires photosensitive glass fibers and also requires manufacture of a specific mask for each type of fiber grating produced. Furthermore, the length of the produced fiber is limited by the length of the mask unless the fiber is displaced and re-aligned with great precision. This restricts the production of fiber gratings to relatively small lengths making the manufacturing process more time consuming and expensive.

One novel approach that addressed the problems in fabrication techniques of previously known fiber gratings is disclosed in the commonly-assigned co-pending U.S. patent application entitled "Apparatus and Method for Manufacturing Periodic Grating Optical Fibers". This approach involved twisting a heated optical preform (comprising either a single fiber or multiple adjacent fibers) to form a chiral structure having chiral fiber grating properties. Another novel approach for fabricating chiral fibers having chiral fiber grating properties, disclosed in the commonly-assigned co-pending U.S. provisional patent application entitled "Apparatus and Method for Fabricating Helical Fiber Bragg Gratings", involved heating and twisting optical fibers having various core cross-section configurations or composed of different dielectric materials, inscribing patterns on the outer surface of the fiber cores, and optionally filling the patterns with dielectric materials.

It would thus be desirable to provide an advantageous fiber grating that has superior properties and that is easy to fabricate.

BRIEF DESCRIPTION OF THE DRAWING

In the drawings, wherein like reference characters denote elements throughout the several views.

SUMMARY OF THE INVENTION

Figure 1A:
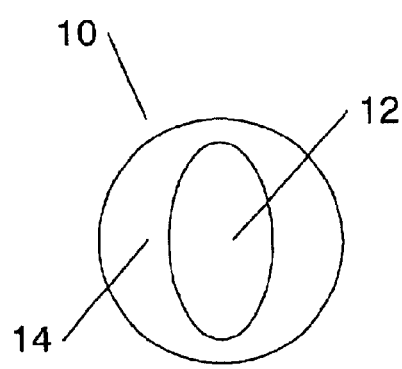
FIG. 1A is a schematic diagram of a cross-section view of a first embodiment of the fiber grating structure of the present invention.

The present invention is directed to a novel optical fiber having properties similar to a cholesteric liquid crystal (CLC) structure. The inventive chiral optical fiber achieves properties similar to a CLC structure because it satisfies the requirement that in a CLC structure the pitch of the structure is twice its period. This is accomplished by imposing two identical coaxial helixes along a fiber structure, where the second helix is shifted by half of the structure's pitch forward from the first helix. A chiral structure with a single helix along its length does not mimic CLC properties, but is also advantageous in certain applications. Several embodiments of advantageous double helix structures, as well as a single helix structure, implemented in optical fibers are discussed below.

In a first embodiment of the present invention, the inventive chiral fiber is composed of a single material but has a non-circular cross-section having 180 degree cross-sectional symmetry. Because of this configuration, when the fiber is twisted, a double helix structure is formed. The exact cross sectional shape of the optical fiber may be selected from a variety of non-circular geometric shapes as long as 180 degree cross-sectional symmetry is maintained.

In a second embodiment of the present invention, the inventive chiral fiber is composed of a single material but has a non-circular cross-section having 180 degree cross-sectional symmetry. Because of this configuration, when the fiber is twisted, a double helix structure is formed. The exact cross sectional shape of the optical fiber may be selected from a variety of non-circular geometric shapes as long as 180 degree cross-sectional symmetry is maintained. The second embodiment of the inventive chiral fiber includes a hollow cylindrical cladding either surrounding or in contact with the core, where the empty space between the inner surface of the cladding and the core is filled with a different material from the core. The different material may be any air or any dielectric material having different optical properties from the core.

In a third embodiment of the present invention, the inventive chiral fiber is composed of first quarter-cylindrical portion of a first material in contact on each side with a second and third quarter cylindrical portions composed of a second material, and a fourth quarter-cylindrical portion of the first material contacting its sides with the second and third quarter cylindrical portion sides that are not in contact with the first quarter-cylindrical portion; where all vertices of the first, second, third and fourth quarter-cylindrical portions are aligned with the central longitudinal axis of the optical fiber. Each of the first and second materials have different optical properties. The fiber is then twisted around its longitudinal axis so that a double helix structure along the length of the fiber is formed from the two different materials. The specific materials used may be selected as a matter of design choice without departing from the spirit of the invention.

In a fourth embodiment of the present invention, the first and second helices of the desired double helix structure are formed by wrapping elongated members composed of a dielectric material, having different optical properties from the material of the chiral fiber core, around the outside surface of the core to form two sequential helices. The composition of the elongated members may be selected as a matter of design choice without departing from the spirit of the invention.

In a fifth embodiment of the present invention, the first and second helices of the desired double helix structure are formed by a pair of grooves cut into sides of an optical fiber in a double helix pattern. The shape and size of the grooves may be selected as a matter of design choice without departing from the spirit of the invention.

In a sixth embodiment of the present invention, the first and second helices of the desired double helix structure are formed by a pair of grooves cut into sides of the chiral fiber in a double helix pattern and filled with a dielectric material having different optical properties from the material of the fiber core. The shape and size of the grooves and the dielectric material may be selected as a matter of design choice without departing from the spirit of the invention.

In a seventh embodiment of the present invention, the chiral fiber is composed of a first half-cylindrical portion of a first material parallel to a second half-cylindrical portion of a second material, where each of the first and second materials have different optical properties. The fiber is then twisted around its longitudinal axis so that a single helix structure along the length of the fiber is formed from the two different materials. The specific materials used may be selected as a matter of design choice without departing from the spirit of the invention. While this arrangement does not form the desirable double helix structure (and thus does not mimic CLC properties), a chiral fiber having a single helix configuration is still useful in a number of applications requiring optically resonant materials.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to optically resonant optical fiber structures and more specifically to advantageous fiber gratings that in certain configurations embody advantages of cholesteric liquid crystals (CLCs) in a simplified easy-to-use fiber form.

Presently used fiber Bragg gratings may be seen as analogous to 1D layered dielectric media. CLCs are a superior form of 1D periodic structures. However, CLCs do not currently exist in a fiber from. Because CLCs exhibit superior properties in comparison to layered media (as disclosed in commonly assigned co-pending U.S. patent application entitled "Chiral Laser Apparatus and Method" Ser. No. 09/468,148), it would be advantageous to implement the essence of a cholesteric periodic photonic band gap structure in an optical fiber. This novel approach captures the superior optical properties of cholesteric liquid crystals while facilitating the manufacture of the structure as a continuous (and thus easier to implement) process.

In order to accomplish this, the inventive structure must mimic the essence of a conventional CLC structure—its longitudinal symmetry. A helical fiber structure appears to have the desired properties. However, in a CLC structure the pitch of the structure is twice its period. This is distinct from the simplest realization of the helical structure, which is a single helix. In the single helix structure, the period is equal to the pitch and one would expect to find the band gap centered at the wavelength equal to twice the pitch. However, this arrangement produces a mismatch between the orientation of the electric field of light passing through the structure and the symmetry of the helix. The field becomes rotated by 360 degrees at a distance equal to the wavelength of light of twice the pitch. On the other hand, the helix rotation in this distance is 720 degrees. Thus, while a fiber grating based on a single helix structure has certain beneficial applications, it does not truly mimic the desirable CLC structure, although such a structure still provides significant benefits in certain applications as described below in connection with FIGS. 4A to 7B.

In accordance with the present invention, a structure that meets the requirements for producing a photonic stop band, while preserving the advantages of a cholesteric structure, must satisfy one crucial requirement: that the pitch of the structure is twice the period. If this requirement is met in a structure then the photonic band gap will be created for radiation propagating through the structure that satisfies the following requirements:

(1) the radiation must be circularly polarized with the same handedness as the structure;
(2) the radiation must propagate along the longitudinal axis of the structure; and
(3) the wavelength of the radiation inside the structure must be approximately equal to the pitch of the structure.

The inventive structure that advantageously satisfies the requirement that its pitch be twice its period, has a double helix configuration, where two identical coaxial helixes are imposed in or on a fiber structure, and where the second helix is shifted by half of the structure's pitch forward from the first helix.

Several embodiments of advantageous double helix structures as well as a single helix structure implemented in optical fibers are discussed below in connection with FIGS. 1A–7B. Various apparatus and methods that may be advantageously utilized in fabricating such double and single helix structures are disclosed in the commonly assigned co-pending U.S. patent applications entitled "Apparatus and Method for Manufacturing Periodic Grating Optical Fibers", "Apparatus and Method of Manufacturing Chiral Fiber Bragg Gratings", and "Apparatus and Method for Manufacturing Helical Fiber Bragg Gratings", which are all incorporated by reference herein in their entirety.

However, it should be noted that the various embodiments of the inventive chiral structures shown below in connection with FIGS. 1A to 7B are shown by way of example only and should not be construed as the only structures that will result in desirable CLC properties. In accordance with the present invention, the inventive chiral fiber may be implemented as any fiber structure that has a pitch equal to twice the structure's period.

The inventive chiral fiber structures are shown in the drawings with a cladding material surrounding the fiber core. It should be noted that the cladding material is shown by way of example only—the inventive chiral fiber structures may be fabricated with or without the cladding (for example cladding may be applied to the core after fabrication) as a matter of design choice without departing from the spirit of the invention. Additional coating materials (such as "super-cladding" may also be added to the inventive chiral fibers as a matter of design choice.

Figure 1B:
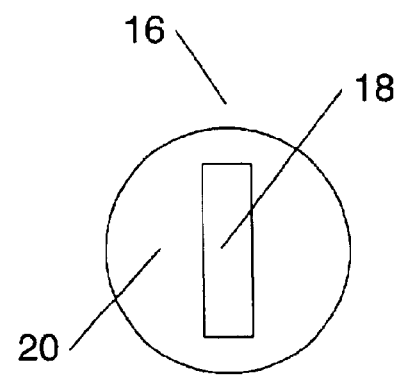
FIG. 1B is a schematic diagram of a cross-section view of an alternate first embodiment of the fiber grating structure of the present invention.
Figure 1C:
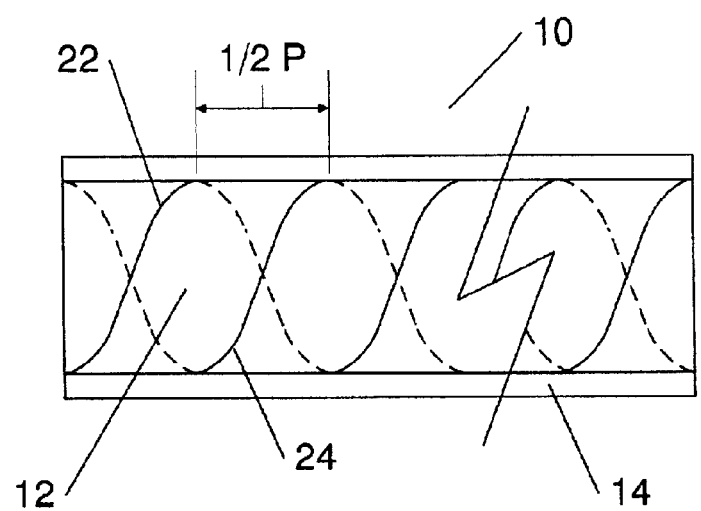
FIG. 1C is a schematic diagram of a side view of the first embodiment of the fiber grating structure of the present invention.

Referring now to FIGS. 1A to 1C, a first embodiment of the present invention is shown where a chiral fiber 10 includes a core 12 with an oval cross-section and an optional cladding 14 surrounding the core 12. An alternate embodiment of the chiral fiber 10 is shown as a chiral fiber 16 with a rectangular core 18 and an optional cladding 20. It should be noted that the oval and rectangular cross sections of FIGS. 1A and 1B are shown by way of example only and other non-circular cross sectional shapes having 180 degree cross-sectional symmetry may be used as a matter of design choice without departing from the spirit of the invention.

FIG. 1C shows a cross section of the chiral fiber 10 twisted about its longitudinal axis. Because the core 12 has non-circular 180 degree cross-sectional symmetry, when the chiral fiber 10 is twisted about its longitudinal axis, a double helix structure is thereby formed, with a second helix 24 being displaced forward from a first helix 22 by one half of the pitch of the chiral fiber 10. Thus, as noted above, the exact cross sectional shape of the optical fiber may be selected from a variety of non-circular geometric shapes as long as 180 degree cross-sectional symmetry is maintained.

Figure 2A:
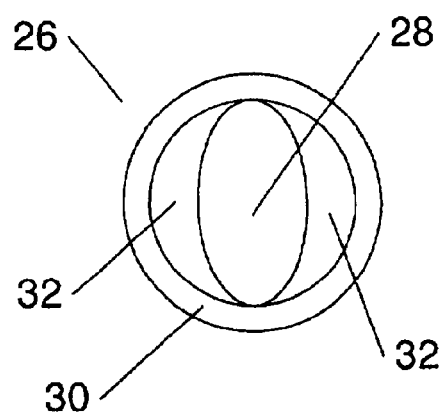
FIG. 2A is a schematic diagram of a cross-section view of a second embodiment of the fiber grating structure of the present invention.
Figure 2B:
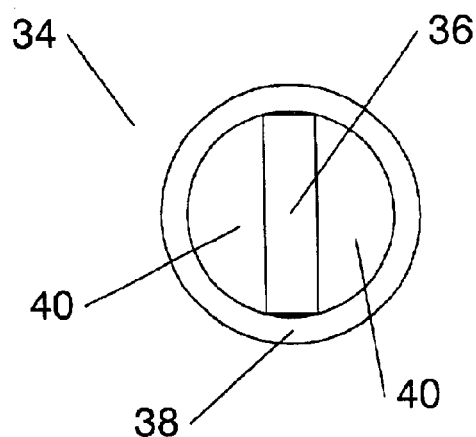
FIG. 2B is a schematic diagram of a cross-section view of an alternate second embodiment of the fiber grating structure of the present invention.
Figure 2C:
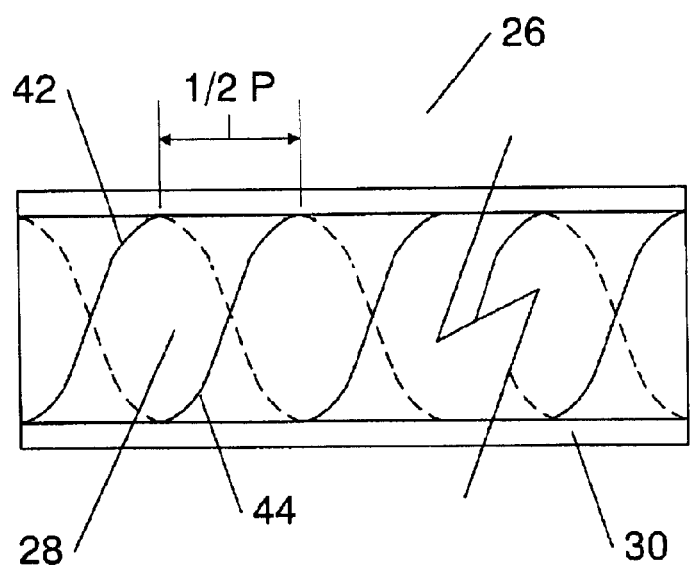
FIG. 2C is a schematic diagram of a side view of the second embodiment of the fiber grating structure of the present invention.

Referring now to FIGS. 2A to 2C, a second embodiment of the present invention is shown where a chiral fiber 26 includes a core 28 with an oval cross-section and an optional hollow cylindrical cladding 30 either surrounding or in contact with the core 28. A dielectric material 32 is disposed within the empty space between the core 28 and an inner surface of the cladding 20. The dielectric material 32 may be any dielectric substance with different optical characteristics from the core 28. For example, the material 32 may be air, dielectric fluid, or glass with different properties from the core 28. An alternate embodiment of the chiral fiber 26 is shown as chiral fiber 34 with a rectangular core 36, an optional hollow cylindrical cladding 38 and a dielectric material 40 disposed in the empty space between the core 36 and the inner surface of the cladding 38. It should be noted that the oval and rectangular cross sections of FIGS. 2A and 2B are shown by way of example only and other non-circular cross sectional shapes having 180 degree cross-sectional symmetry may be used as a matter of design choice without departing from the spirit of the invention.

FIG. 2C shows a cross section of the chiral fiber 26 twisted about its longitudinal axis. Because the core 28 has non-circular 180 degree cross-sectional symmetry, when the chiral fiber 26 is twisted about its longitudinal axis, a double helix structure is thereby formed, with a second helix 44 being displaced forward from a first helix 42 by one half of the pitch of the chiral fiber 26. Thus, as noted above, the exact cross sectional shape of the optical fiber may be selected from a variety of non-circular geometric shapes as long as 180 degree cross-sectional symmetry is maintained.

Figure 3A:
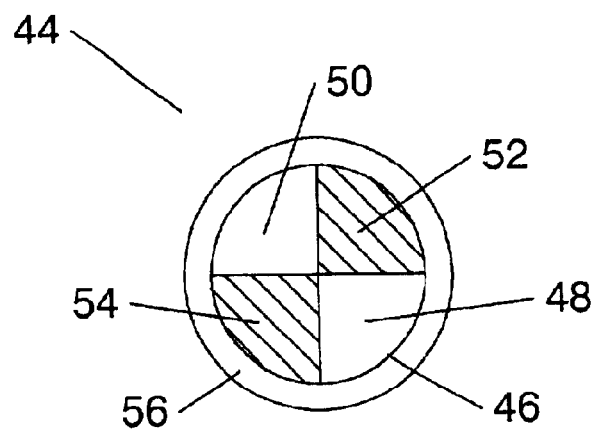
FIG. 3A is a schematic diagram of a cross-section view of a third embodiment of the fiber grating structure of the present invention.
Figure 3B:
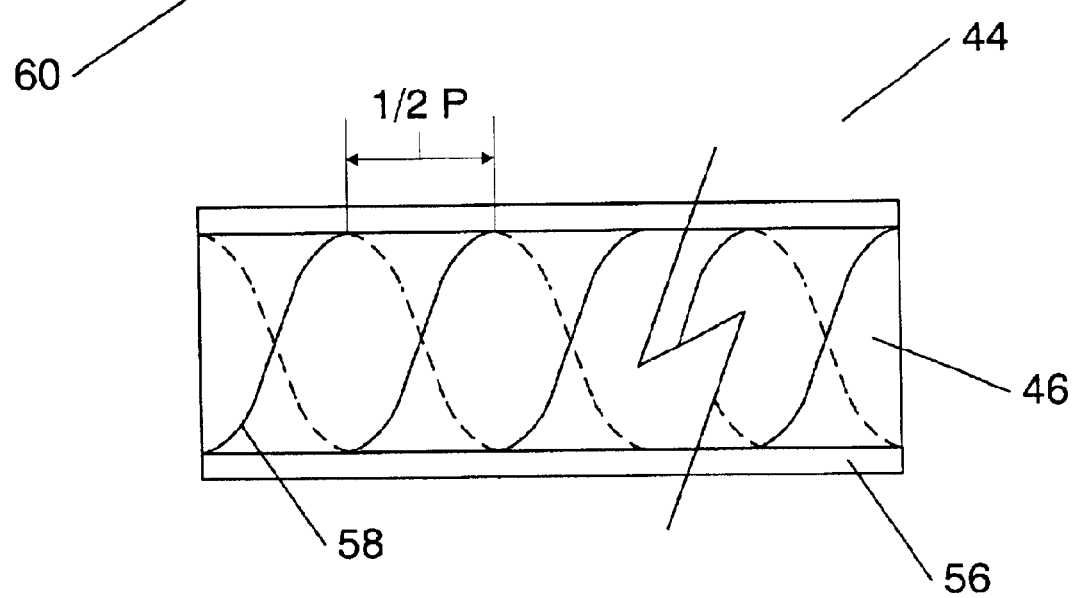
FIG. 3B is a schematic diagram of a side view of the third embodiment of the fiber grating structure of the present invention.

Referring now to FIGS. 3A and 3B, a third embodiment of the present invention is shown where chiral fiber 44 includes a core 46 that is composed of a first quarter-cylindrical portion 48 of a first material in contact on each side with a second and third quarter cylindrical portions, 52, 54 composed of a second material, and a fourth quarter-cylindrical portion 50 of the first material contacting its sides with the second and third quarter cylindrical portion 52, 54 sides that are not in contact with the first quarter-cylindrical portion 48; where all vertices of the first, second, third and fourth quarter-cylindrical portions 48, 50, 52, 54 are aligned with the central longitudinal axis of the chiral fiber 44. Each of the first and second materials have different optical properties. The first and second materials may be selected from a variety of glass and other dielectric substances as a matter of design choice. For example, one of the materials may be air. The core 46 is enclosed by an optional cladding 56. FIG. 3B shows the chiral fiber 44 twisted around its longitudinal axis so that a double helix structure along the length of the fiber is formed from the first and second materials, with a second helix 60 being displaced forward from a first helix 58 by one half of the pitch of the chiral fiber 44.

Figure 4A:
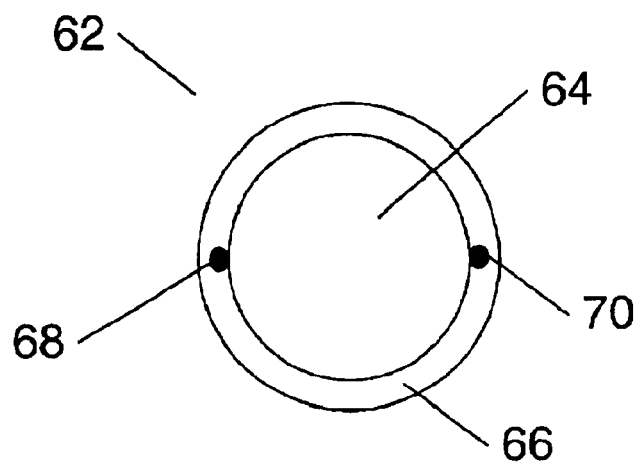
FIG. 4A is a schematic diagram of a cross-section view of a fourth embodiment of the fiber grating structure of the present invention.
Figure 4B:
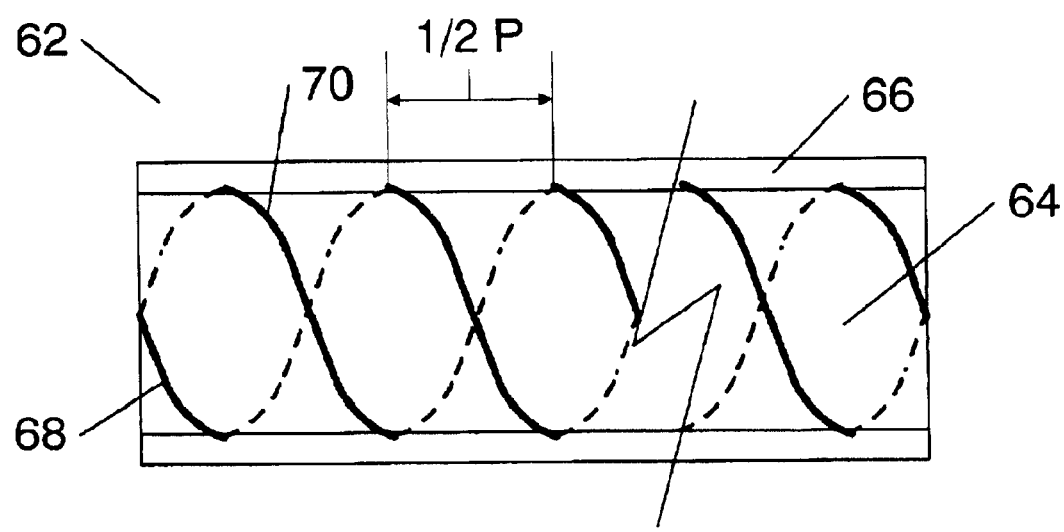
FIG. 4B is a schematic diagram of a side view of the fourth embodiment of the fiber grating structure of the present invention.

Referring now to FIGS. 4A and 4B, a fourth embodiment of the present invention is shown where chiral fiber 62 includes a core 64 composed of a first dielectric material and elongated members 68, 70, each composed of a second dielectric material, wrapped around the core 64 to form two sequential helices. An optional cladding 66 encloses the wrapped core 64. The first and second dielectric materials preferably have different optical properties and may be selected from a variety of glass and other dielectric substances as a matter of design choice. FIG. 4B shows the chiral fiber 62 with the double helix structure formed by elongated members 68, 70 wrapped around the core 64 along the length of the fiber 62. The second helix formed by the elongated member 70 is displaced forward from the first helix formed by the elongated member 68 by one half of the pitch of the chiral fiber 62. It should be noted that as a matter of design choice only one of the elongated members 68, 70 may be wrapped around the core 64 (not shown)—in this case a single helix structure is formed which results in a fiber grating enabling different propagation speed of signals with the same handedness as the structure with respect to signals with opposite handedness as the structure at a wavelength substantially equal to the pitch of the single helix which in turn results in rotation of the polarization plane of linearly polarized light.

Figure 5A:
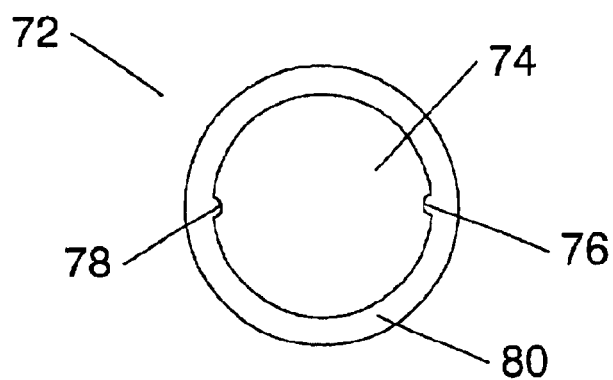
FIG. 5A is a schematic diagram of a cross-section view of a fifth embodiment of the fiber grating structure of the present invention.
Figure 5B:
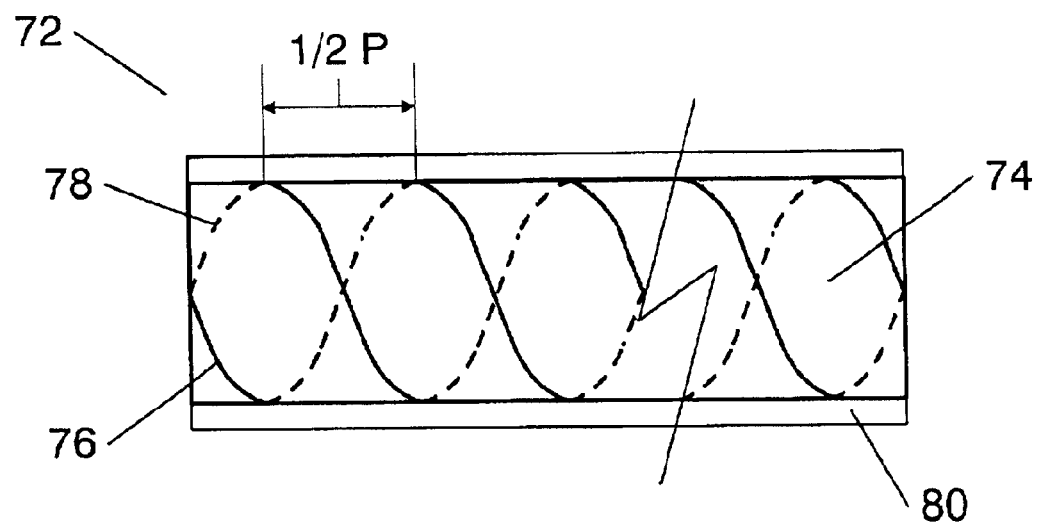
FIG. 5B is a schematic diagram of a side view of the fifth embodiment of the fiber grating structure of the present invention.

Referring now to FIGS. 5A and 5B, a fifth embodiment of the present invention is shown where chiral fiber 72 includes a core 74 having a pair of grooves 76, 78 tracing a double helix pattern on its surface. The double helix pattern may be achieved by cutting the grooves 76, 78 into the outer surface of the core 74 in a double helix pattern, or by twisting a core with a pair of opposed straight longitudinal grooves in its sides such that the grooves form a double helix pattern. The size and shape of the grooves 76, 78 may be selected as a matter of design choice without departing from the spirit of the invention. An optional cladding 80 encloses the core 74. FIG. 5B shows the chiral fiber 72 with the double helix structure formed by the grooves 76, 78 defined in the outer surface of the core 74 along the length of the fiber 72. The second helix formed by the groove 78 is displaced forward from the first helix, formed by the groove 76, by one half of the pitch of the chiral fiber 72.

It should be noted that as a matter of design choice only one of the grooves 76, 78 may be inscribed (not shown)—in this case a single helix structure is formed which results in a fiber grating enabling different propagation speed of signals with the same handedness as the structure with respect to signals with opposite handedness as the structure at a wavelength substantially equal to the pitch of the single helix which in turn results in rotation of the polarization plane of linearly polarized light.

Figure 6A:
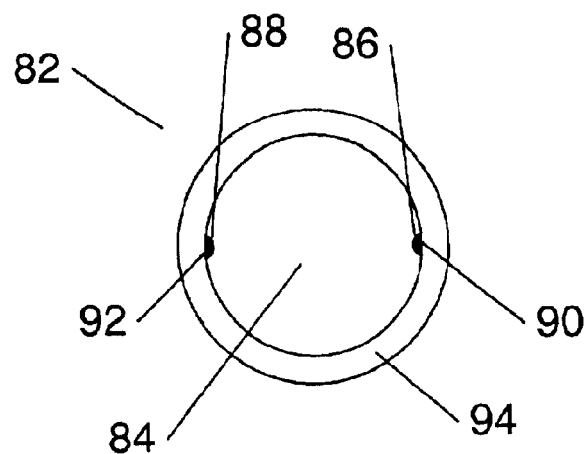
FIG. 6A is a schematic diagram of a cross-section view of a sixth embodiment of the fiber grating structure of the present invention.
Figure 6B:
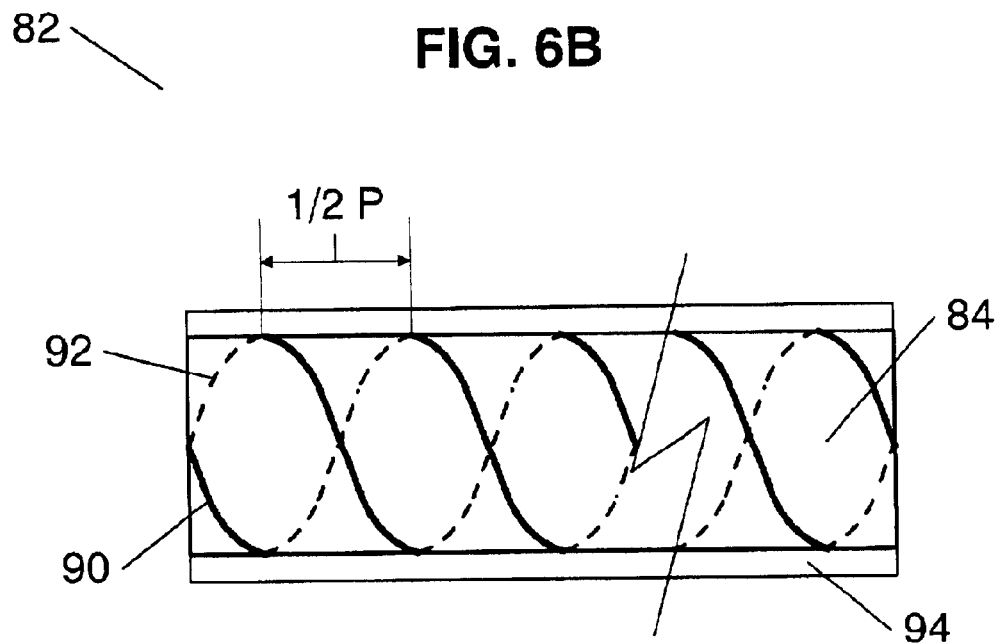
FIG. 6B is a schematic diagram of a side view of the sixth embodiment of the fiber grating structure of the present invention.

Referring now to FIGS. 6A and 6B, a sixth embodiment of the present invention is shown as a chiral fiber 82. The chiral fiber 82 is formed by a combination of techniques used to form the chiral fiber 62 of FIG. 4A and the chiral fiber 72 of FIG. 5A. The chiral fiber 82 includes a core 84, composed of a first dielectric material, having a pair of grooves 86, 88 tracing a double helix pattern on its surface. The grooves 86, 88 are filled with respective dielectric elements 90, 92 composed of a second dielectric material.

The first and second dielectric materials preferably have different optical properties and may be selected from a variety of glass and other dielectric substances as a matter of design choice. The double helix pattern may be achieved by cutting the grooves 86, 88 into the outer surface of the core 84 in a double helix pattern and then filling them in with the respective dielectric elements 90, 92 (for example by aligning the elements 90, 92 with the grooves 86, 88 and wrapping the core 94 with the elements 90, 92 such that the elements 90, 92 fill the respective grooves 86, 88.

Alternately, the double helix patter may be achieved by twisting a core with a pair of opposed straight longitudinal grooves in its sides filled with the dielectric elements such that the dielectric elements form a double helix pattern. The size and shape of the grooves 86, 88 may be selected as a matter of design choice to properly fit the dielectric elements 90, 92 without departing from the spirit of the invention. An optional cladding 94 encloses the core 84. FIG. 6B shows the chiral fiber 82 with the double helix structure formed by the dielectric members 90, 92 filling in the grooves 86, 88 along the length of the fiber 82. The second helix formed by the dielectric element 92 is displaced forward from the first helix formed by the dielectric element 90 by one half of the pitch of the chiral fiber 82. Similarly, a single helix fiber grating may be configured as a matter of design choice by inscribing and filling only a single groove.

Figure 7A:
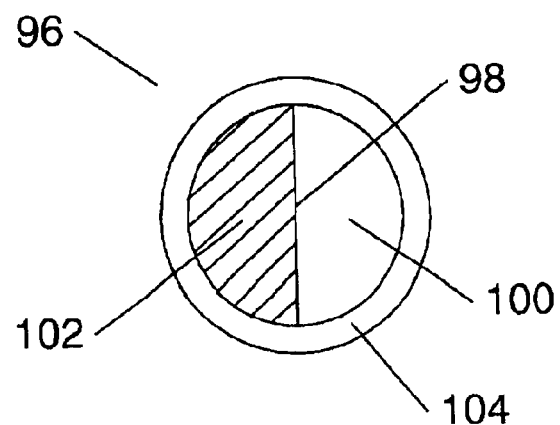
FIG. 7A is a schematic diagram of a cross-section view of a seventh embodiment of a chiral resonant fiber structure of the present invention.
Figure 7B:
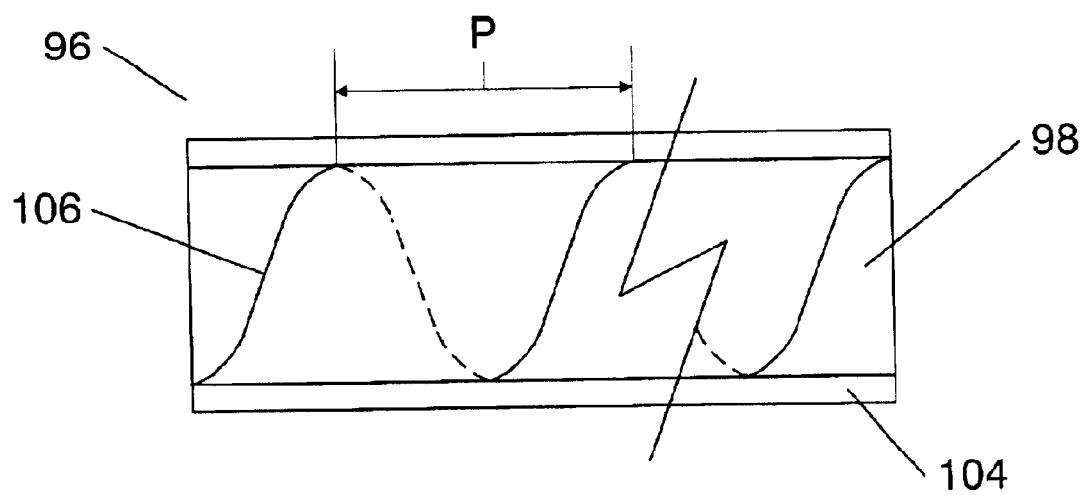
FIG. 7B is a schematic diagram of a side view of the seventh embodiment of a chiral resonant fiber structure of the present invention.

Referring now to FIGS. 7A and 7B, a seventh embodiment of the present invention is shown where chiral fiber 96 includes a core 98 that is composed of a of a first half-cylindrical portion 100 of a first material parallel to a second half-cylindrical portion 102 of a second material, where each of the first and second materials have different optical properties. The first and second materials may be selected from a variety of glass and other dielectric substances as a matter of design choice. The core 98 is enclosed by an optional cladding 104. The chiral fiber 96 differs from previously described embodiments of the present invention in that only a single helix is formed when the chiral fiber 96 is twisted. As a result, the chiral fiber 96 does not meet the requirement for a one-dimensional photonic band gap structure (i.e. that the pitch of the structure be twice the period of the structure). However, a single helix chiral structure is optically resonant and thus can be very useful in certain applications, such as add/drop filters. For example, a single helix chiral element can be advantageously utilized in the devices disclosed in the co-pending commonly assigned U.S. patent application entitled "Add-Drop Filter Utilizing Chiral Elements" and in the co-pending commonly assigned U.S. provisional patent application entitled "Configurable Add-Drop Filter Utilizing Resonant Optical Activity".

FIG. 7B shows the chiral fiber 96 twisted around its longitudinal axis so that a single helix structure 106 along the length of the fiber 96 is formed from the first and second materials. The single helix structure results in a fiber grating enabling different propagation speed of signals with the same handedness as the structure with respect to signals with opposite handedness as the structure at a wavelength substantially equal to the pitch of the single helix which in turn results in rotation of the polarization plane of linearly polarized light.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A fiber grating having a central longitudinal axis, comprising:
   an optical chiral fiber core having a refractive index modulation imposed along the central longitudinal axis in one of a first and a second refractive index profiles, wherein;
   said first refractive index profile comprises a first helical pitch and a period, wherein said first helical pitch is twice said period; and
   said second refractive index profile comprises a second helical pitch and said period, wherein said second helical pitch is substantially equal to said period.

2. The fiber grating of claim 1, further comprising at least one layer of cladding disposed around and along said optical chiral fiber core.

3. The fiber grating of claim 1, wherein said optical fiber core having said refractive index modulation of said first refractive index profile, is of a predefined handedness, wherein when a circularly polarized signal of said predefined handedness, having a wavelength approximately equal to said first helical pitch, propagates therethrough along said central longitudinal axis, said signal is subjected to a photonic band gap, such that said chiral fiber core mimics properties of a cholesteric liquid crystal.

4. The fiber grating of claim 1, wherein a cross-section of said optical chiral fiber core is non-circular and comprises 180 degree cross-sectional symmetry, and wherein said core being uniformly twisted about the central longitudinal axis to produce said refractive index modulation of said first refractive index profile.

5. The fiber grating of claim 4, wherein said cross section is selected from a group comprising: an oval and a rectangle.

6. The fiber grating of claim 4, further comprising:
   a hollow cladding cylinder having an inner surface, said cladding cylinder extending along and about the central longitudinal axis, said twisted optical fiber core disposed centrally therein; and
   filling material disposed in an empty area between said twisted optical fiber core and said inner surface of said cladding cylinder.

7. The fiber grating of claim 6, wherein said twisted optical fiber core is composed of a first dielectric material, wherein said filling material is composed from a second dielectric material, and wherein said first and second dielectric materials are of different optical properties.

8. The fiber grating of claim 7, wherein second dielectric material is selected from a group comprising: air, dielectric fluid, glass, polymer, and plastic.

9. The fiber grating of claim 1, wherein said refractive index modulation of said first refractive index profile, comprises a double helical pattern, comprising a first and a second helix, defined along the central longitudinal axis of said optical fiber core, and wherein said second helix is positioned one half of said first helical pitch forward from said first helix.

10. The fiber grating of claim 9, wherein said first helix comprises a first helical groove inscribed in an outer surface of said optical fiber core, and wherein said second helix comprises a second helical groove inscribed in said outer surface.

11. The fiber grating of claim 10, wherein said optical fiber core is composed of a first dielectric material, and wherein said first and said second helical grooves are filled with a second dielectric material having optical properties that are different from said first dielectric material.

12. The fiber grating of claim 9, wherein said optical fiber core is composed of a first dielectric material, wherein said first helix comprises a first coil of a second dielectric material wrapped in a first helical pattern of said first helical pitch around said optical fiber core along the central longitudinal axis; and wherein said second helix comprises a second coil of said second dielectric material wrapped in a second helical pattern of said first helical pitch around said optical chiral fiber core along the central longitudinal axis, the first and second coils thus forming said double helix pattern, said second dielectric material having optical properties that are different from said first dielectric material.

13. The fiber grating of claim 9, wherein said optical fiber core comprises, clockwise, a first elongated quarter-cylindrical portion composed of a first material, a second elongated quarter-cylindrical portion composed of a second material, in contact with said first portion, a third elongated quarter-cylindrical portion composed of a first material in contact with said second portion, and a fourth elongated quarter-cylindrical portion composed of a second material in contact with said third and said first portions, said second material having different optical properties from said first material, wherein when said optical chiral fiber core is twisted about the central longitudinal axis, one of said first and second helices is formed by said first and third portions of said first material and the other of said first and second helices is formed from said second and fourth portions of said second material.

14. The chiral fiber grating of claim 1, wherein said optical fiber core comprises an elongated optical fiber having a first elongated half-cylindrical portion composed of a first material and a second elongated half-cylindrical portion composed of a second material, said second material having different optical properties from said first material, and said first and second portions having their flat surfaces in contact with one another, said elongated optical fiber being twisted about said central longitudinal axis such that a single helix structure composed of said first and said second materials is formed enabling different propagation speed of waves with the same handedness, and of waves with opposite handedness, at a wavelength substantially equal to said second pitch, thereby resulting in rotation of polarization plane of linearly polarized light.

15. The fiber grating of claim 1, wherein said refractive index modulation of said second refractive index profile, comprises a helical pattern, said helical pattern comprising a helix of said second helical pitch defined along the central longitudinal axis of said optical fiber core.

16. The fiber grating of claim 15, wherein said helix comprises a helical groove inscribed in an outer surface of said optical fiber core.

17. The fiber grating of claim 16, wherein said optical fiber core is composed of a first dielectric material, and wherein said helical groove is filled with a second dielectric material having optical properties that are different from said first dielectric material.

18. The fiber grating of claim 17, wherein said optical fiber core is composed of a first dielectric material, wherein said helix comprises a coil of a second dielectric material wrapped in said helical pattern of said second helical pitch around said optical fiber core along the central longitudinal axis, said second dielectric material having optical properties that are different from said first dielectric material.

* * * * *